United States Patent
Yoshida et al.

(10) Patent No.: US 8,445,154 B2
(45) Date of Patent: May 21, 2013

(54) HEADER FOR SUPPLYING GAS IN FUEL CELL AND FUEL CELL POWER SYSTEM

(75) Inventors: Tadashi Yoshida, Hitachi (JP); Hiromi Tokoi, Naka (JP); Kazuo Takahashi, Hitachiota (JP); Shin Takahashi, Hitachi (JP); Akihiko Noie, Hitachinaka (JP); Akira Gunji, Hitachinaka (JP); Nariyoshi Kobayashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1410 days.

(21) Appl. No.: 11/770,782

(22) Filed: Jun. 29, 2007

(65) Prior Publication Data

US 2008/0014485 A1    Jan. 17, 2008

(30) Foreign Application Priority Data

Jul. 11, 2006  (JP) .................................. 2006-190223

(51) Int. Cl.
*H01M 8/04* (2006.01)

(52) U.S. Cl.
USPC ........................................................ 429/434

(58) Field of Classification Search
USPC ............................................... 429/433, 434
See application file for complete search history.

(56) References Cited

U.S. PATENT DOCUMENTS

| | | | |
|---|---|---|---|
| 4,876,163 | A | 10/1989 | Reichner |
| 2001/0023035 | A1* | 9/2001 | Lehnert et al. .................. 429/26 |
| 2003/0054209 | A1* | 3/2003 | Gillett et al. .................... 429/13 |

FOREIGN PATENT DOCUMENTS

| | | |
|---|---|---|
| JP | 01-173577 | 7/1989 |
| JP | 2002-280053 | 9/2002 |
| JP | 2005-100687 | 4/2005 |
| JP | 2005-203165 | 7/2005 |

OTHER PUBLICATIONS

Communication dated Jan. 30, 2012, in connection with Japanese Application No. 2006-190223; 2 pages; Japanese Patent Office, Japan.

* cited by examiner

*Primary Examiner* — Patrick Ryan
*Assistant Examiner* — Muhammad Siddiquee
(74) *Attorney, Agent, or Firm* — Antonelli, Terry, Stout & Kraus, LLP.

(57) ABSTRACT

The present invention provides a fuel cell power system, in which a combustion exhaust gas having a high temperature and generated by the combustion reaction of unreacted fuel gas and oxidizer gas which are not utilized in a power-generating reaction is introduced into a gas header for distributing the fuel gas or the oxidizer gas to a plurality of fuel cells contained in a fuel cell body, in such a way that a larger amount of heat is transferred to the gas which is to be supplied to the cells disposed in a peripheral area of the fuel cell body by heat exchange, and a smaller amount of the heat is transferred to the gas which is to be supplied to the cells disposed in a central area of the fuel cell body.

16 Claims, 3 Drawing Sheets

HEADER FOR SUPPLYING GAS IN FUEL CELL AND FUEL CELL POWER SYSTEM

BACKGROUND OF THE INVENTION

1. Field of the Invention

The present invention relates to a gas supplying header for supplying a cell reaction gas, such as a fuel gas or an oxidizer gas, to fuel cells, and relates to a fuel cell power system including the gas supplying header. The present invention is particularly applied to an oxidizer gas-supplying header in a fuel cell power system which is operated at a high temperature, such as a solid oxide fuel cell power system.

2. Description of the Related Art

A solid oxide fuel cell power system has been studied and developed extensively, because a power-generating efficiency is high, and a waste heat is utilizable although an operating temperature thereof is as high as about 900° C. in average. Since there is a limit to a power output from single cell in the solid oxide fuel cell power system, a plurality of cells are typically assembled. In order to ensure a high power output, it is necessary to eliminate the variation in temperature profile between cells. In effect, however, the temperature in a center area is liable to be higher, as compared with that in a peripheral area. This is because a heat generated with a power-generating reaction is liable to be confined in the center area but liable to be dissipated in the peripheral area.

It has been known to place a surface combustion burner within a power-generating reaction chamber as a measure for equalizing the temperature profile in the fuel cell in the solid oxide fuel cell power system (for example, see JP-A-2002-280053).

SUMMARY OF THE INVENTION

It is possible to efficiently heat an area having a lowered temperature to eliminate a generation of a temperature gradient by placing a surface combustion burner within a power-generating reaction chamber and contriving a burner-placing location. However, this method requires the surface combustion burner and a mechanism for controlling the burner. For this reason, an increase of accessory equipments is inevitable, which causes a reduction in total efficiency, an increase in equipment cost, degradation in space factor and the like.

Accordingly, it is an object of the invention to provide a gas-supplying header for a fuel cell wherein the variation in temperature profile between fuel cells can be eliminated without accessory equipments such as a surface combustion burner. It is another object of the present invention to provide a fuel cell power system including such a gas-supplying header.

To achieve the above object, the invention provides a gas-supplying header including a mechanism for controlling a temperature of a cell reaction gas by heat exchange with a combustion exhaust gas, so that the cell reaction gas having a higher temperature is supplied to an peripheral area of a fuel cell body having a plurality of fuel cells therein, and the cell reaction gas having a lower temperature is supplied to a center area of the fuel cell body.

Embodiments of the present invention are given in the following items (1), (2) and (3).

(1) A header for supplying a gas in a fuel cell, the header being provided in a fuel cell power system which comprises a fuel cell body having a plurality of fuel cells, in which the header distributes a fuel gas or an oxidizer gas to the plurality of fuel cells within the fuel cell body, and in which the fuel gas and the oxidizer gas pass through the fuel cell body for a power-generating reaction, and then unreacted gas being combusted to generate a combustion exhaust gas, wherein the header includes a mechanism for transferring a heat of the combustion exhaust gas to the fuel gas or the oxidizer gas by heat exchange, so that the gas having a higher temperature is supplied to a lower-temperature area of the fuel cell body, and the gas having a lower temperature is supplied to a higher-temperature area of the fuel cell body.

(2) A header for supplying a gas in a fuel cell, the header being provided in a fuel cell power system which comprises a fuel cell body having a plurality of fuel cells, in which the header distributes an oxidizer gas to the plurality of fuel cells within the fuel cell body, and in which the fuel gas and the oxidizer gas pass through the fuel cell body for a power-generating reaction and then unreacted gas are combusted to generate a combustion exhaust gas, wherein the header includes a mechanism for transferring a heat of the combustion exhaust gas to the oxidizer gas by heat exchange, so that the oxidizer gas having a higher temperature is supplied to a lower-temperature area of the fuel cell body, and the oxidizer gas having a lower temperature is supplied to a higher-temperature area of the fuel cell body.

(3) A fuel cell power system comprising: a fuel cell body including a plurality of fuel cells; a fuel gas supplying header for distributing a fuel gas to the plurality of fuel cells in the fuel cell body; and an oxidizer gas supplying header for distributing an oxidizer gas to the plurality of fuel cells in the fuel cell body, wherein the fuel gas and the oxidizer gas contribute to a power-generating reaction within the fuel cell body, and then unreacted gases are combusted to generate a combustion exhaust gas which is discharged from the fuel cell body, and wherein the system comprises a mechanism for transferring a heat of the combustion exhaust gas generated in the fuel cell body to a gas within the fuel gas-supplying header and/or a gas within the oxidizer gas supplying header with distributing a temperature of the gases so that the fuel gas having a higher temperature is supplied from the fuel gas supplying header to a lower-temperature area of the fuel cell body, and/or the oxidizer gas having a higher temperature is supplied from the oxidizer gas supplying header to the lower temperature area of the fuel cell body.

According to present invention, the gas having the high temperature can be supplied to the lower temperature area of the fuel cell body, by utilizing a combustion heat of an unreacted gas which is not utilized for a power-generating reaction in the fuel cell, without need for accessory equipments such as a surface combustion burner and a mechanism for controlling the accessory equipments. In this manner, the generation of the variation in temperature between the cells can be eliminated.

Other objects, features and advantages of the invention will become apparent from the following description of the embodiments of the invention taken in conjunction with the accompanying drawings.

DETAILED DESCRIPTION OF PREFERRED EMBODIMENT

Figure 1:
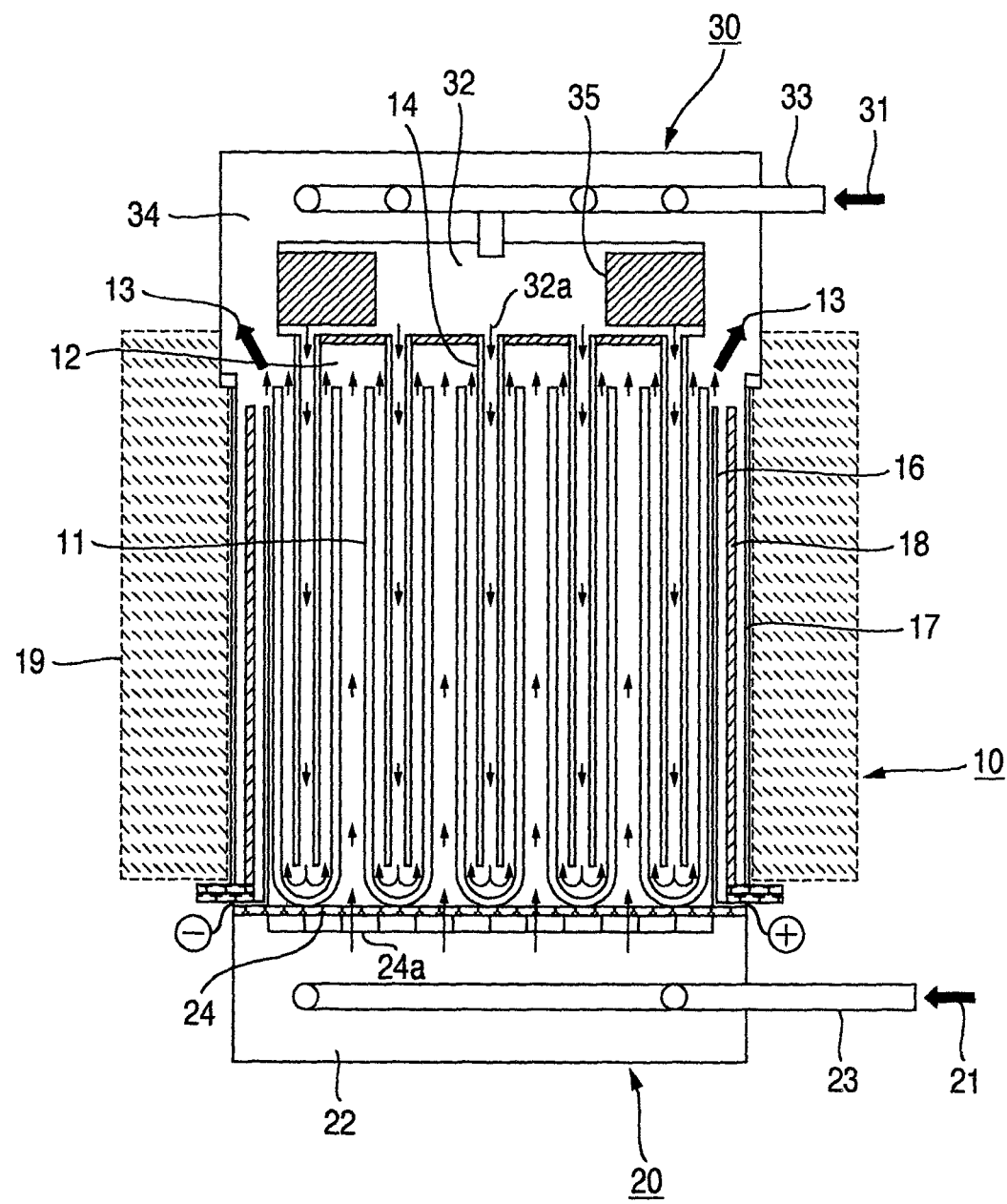
FIG. 1 is a schematic view showing the arrangement of a solid oxide fuel cell power system according to an embodiment of the present invention.

FIG. 1 is a schematic view showing the arrangement of a fuel cell power system according to an embodiment of the present invention. The illustration of the detailed structure of a fuel cell is omitted in FIG. 1, but the fuel cell is of a three-layer structure comprising a fuel electrode (anode), an electrolyte and an oxidizer electrode (cathode). Two types of fuel cells are known, in one of which the inside of an end-closed cylindrical cell tube is a fuel electrode and the outside of the tube is an oxidizer electrode, and in the other of which the inside is an oxidizer electrode and the outside is a fuel electrode. The present invention can be applied to both of these types. FIG. 1 shows the type of fuel cell in which the inside of the cell tube is the oxidizer electrode and the outside is the fuel electrode.

The fuel cell power system shown in FIG. 1 is comprised of a fuel cell body 10, a fuel gas-supplying header 20, and an oxidizer gas-supplying header 30. A fuel gas 21 comprising methane or hydrogen or both of them is supplied from the fuel gas-supplying header 20 to the fuel cell body 10 and reacted on a fuel electrode (anode). On the other hand, an oxidizer gas 31 such as air is supplied from the oxidizer gas-supplying header 30 to oxidizer gas-introducing pipes 14 inserted into fuel cells 11 within the fuel cell body 10 down to sack-shaped portions at the bottoms of the cells 11. The oxidizer gas 31 supplied into the oxidizer gas-introducing pipes 14 is blown in the cells at the bottoms of the cells and then reversed to flow upwards for reaction on an oxidizer electrode (cathode). The fuel gas 21 and the oxidizer gas 31 are met at an upper portion of the cells, and an unreacted gas which did not contribute to a cell reaction cause a combustion reaction in unreacted-gas combustion chambers 12. The resulting combustion exhaust gas 13 having a high temperature is discharged to the outside.

In this embodiment, the fuel cell body 10 is comprised of the fuel cells 11, the oxidizer gas-introducing pipes 14, a collector plate 16, an electrically insulating plate 18, a seal skin 17, the unreacted-gas combustion chambers 12, and a heat insulator 19. An electric power generated in the fuel cells 11 is taken out through the collector plate 16 to the outside.

The seal skin 17 serves as a container for confining the fuel gas, and is electrically insulated from the fuel cells 11 and the collector plate 16 by the electrically insulting plates 18. The heat insulator 19 is mounted outside the seal skin 17 in order to maintain the temperature inside the seal skin 17.

The fuel gas-supplying header 20 is comprised of a fuel gas chamber 22, a fuel gas-supplying pipe 23, and a rectifier plate 24 having a plurality of gas distributing ports 24a, so that the fuel gas 21 is uniformly distributed by the rectifier plate 24 immediately before being supplied to the plurality of fuel cells 11.

The oxidizer gas-supplying header 30 is comprised of an oxidizer gas chamber 32, an oxidizer gas-supplying pipe 33 and a combustion exhaust gas flow passage 34. The oxidizer gas chamber 32 is provided with gas distributing ports 32a connected to the oxidizer gas-supplying pipes 14 for introducing the oxidizer gas to the oxidizer electrodes (cathodes) of the fuel cells. The oxidizer gas 31 is introduced through the gas distributing ports 32a into the oxidizer gas-supplying pipes 14. In this case, the rectifier plate may be unnecessary, because a rectifying effect is provided by a pressure loss in the oxidizer gas-supplying pipes 14.

An operating temperature for a solid oxide fuel cell is about 900° C. in average. If the temperature of the fuel cells 11 is too lower or too higher than the average temperature, the performance of the cell is degraded. Therefore, it is usually necessary to control a lowest temperature and a highest temperature within about ±50° C. from the average temperature. A temperature profile in the plurality of fuel cells contained in the fuel cell body 10 has a general tendency that the temperature of a central area is higher and the temperature of a peripheral area is lower. This is because a heat generated with the power-generating reaction is liable to be confined in the central area and liable to be dispersed from the peripheral area to the outside.

A common subject in techniques for equalizing the temperature profiles in the plurality of fuel cells is how to supply a lower-temperature gas to the central area and supply a higher-temperature gas to the peripheral area. Since the average temperature in the fuel cells is as high as about 900° C., it is suitable that the lower-temperature gas has a temperature of about 500° C., and higher-temperature gas has a temperature of about 700° C. However, this is the case with the optimal average temperature for the fuel cells being about 900° C. If the optimal average temperature for the fuel cells is about 800° C., or further lowered to about 700° C., it is required that the temperatures of the higher-temperature gas and the lower-temperature gas are also lowered. Such temperature control is usually carried out by placing a heater on the outside or placing a heat exchanger. However, this results in an increase in number of accessory equipments in the fuel cell system, and causes a reduction in total efficiency, an increase in equipment cost and degradation in space factor.

In this embodiment, the higher-temperature combustion exhaust gas 13 resulting from the combustion of the unreacted fuel gas and the oxidizer gas in the unreacted-gas combustion chambers 12 in upper portions of the fuel cells is allowed to flow to the periphery of the oxidizer gas chamber 32 in the oxidizer gas-supplying header 30 mounted at an upper portion of the power system, rather than being discharged directly to the outside, so that it is subjected to a heat exchange with the oxidizer gas 31 to be introduced into the fuel cells. Further, the combustion exhaust gas 13 after this heat exchange, which has a slightly lowered temperature, is allowed to flow to the periphery of the oxidizer gas-supplying pipe 33 for supplying the oxidizer gas 31 to the oxidizer gas chamber 32, whereby it is subjected to the heat exchange with the oxidizer gas introduced into the oxidizer gas chamber 32, so that the oxidizer gas 31 has a lower temperature suitable to be supplied to the central fuel cells 11.

Figure 2:
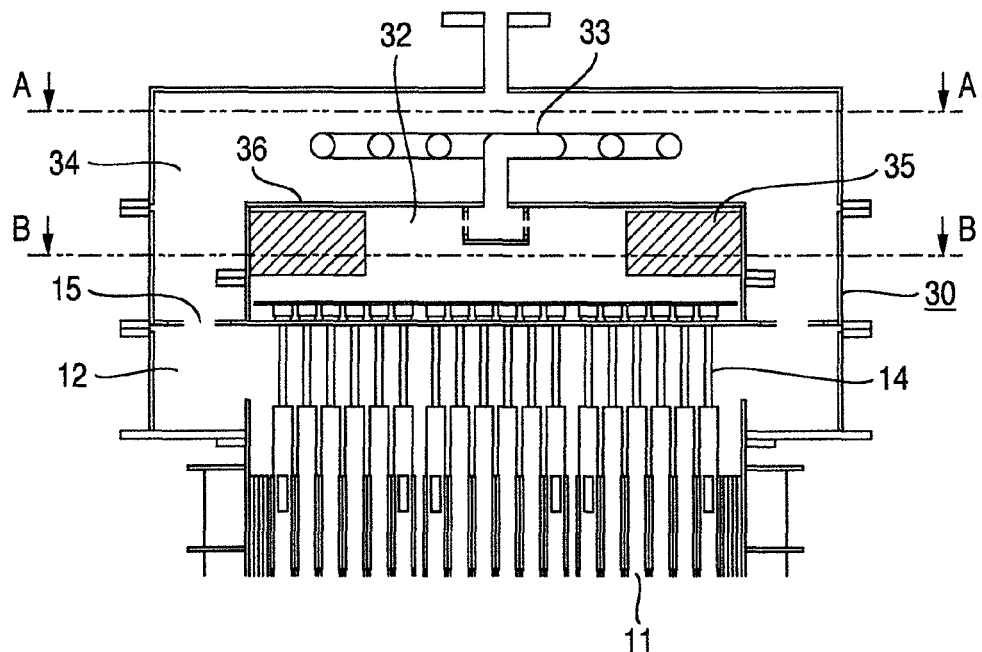
FIG. 2 is a sectional view showing the detailed structure of an oxidizer gas-supplying header.
Figure 3:
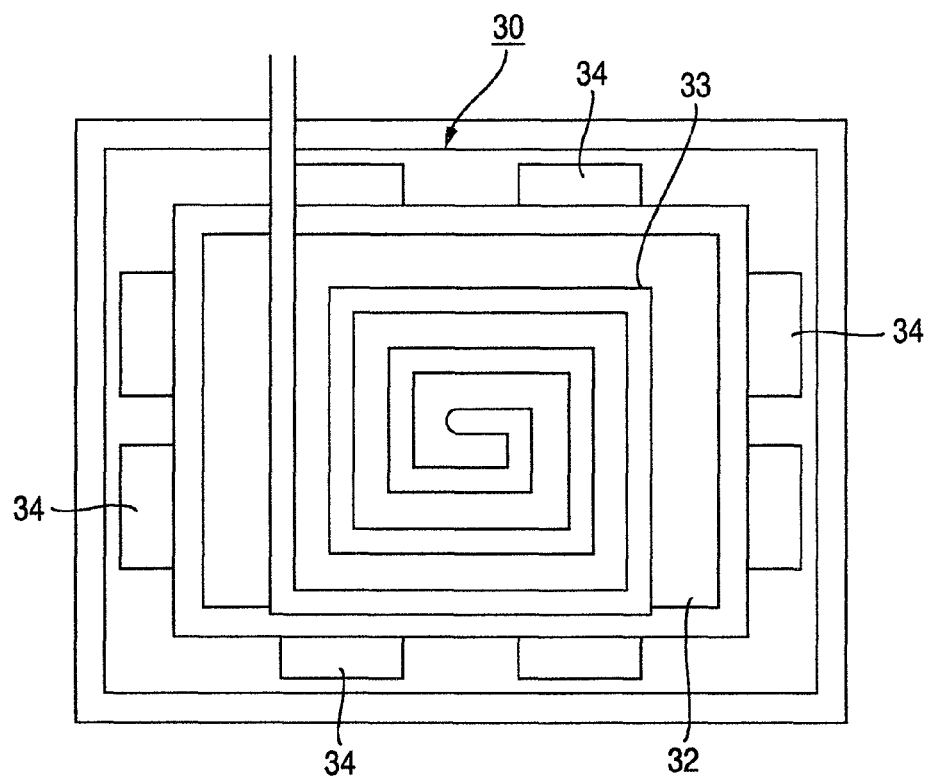
FIG. 3 is a sectional view taken along a line A-A in FIG. 2.

An arrangement of the oxidizer gas-supplying header is shown in FIG. 2. A sectional view taken along a line A-A in FIG. 2 is shown in FIG. 3, and a sectional view taken along a line B-B in FIG. 2 is shown in FIG. 4.

Referring to FIG. 2, the oxidizer gas-supplying header 30 has a structure integrated with the combustion exhaust gas flow passage 34 through which the high-temperature combustion exhaust gas flows generated from the combustion reaction of the unreacted fuel gas and oxidizer gas. The combustion exhaust gas flow passage 34 is formed so as to be capable of being subjected to the heat exchange with the oxidizer gas-supplying pipe 33 for supplying the oxidizer gas 31 to the oxidizer gas chamber 32. Heat-exchange fins 35 are mounted for heat exchange between the oxidizer gas chamber 32 and the combustion exhaust gas flow passage 34.

The high-temperature combustion exhaust gas produced in the unreacted-gas combustion chamber 12 flows through combustion exhaust gas flow bores 15 formed in a partition wall between the fuel cell body 10 and the oxidizer gas-supplying header 30 into the combustion exhaust gas flow passage 34 formed around the oxidizer gas chamber 32. The heat-exchange fins 35 are placed on a partition wall 36 partitioning the oxidizer gas chamber 32 and the combustion exhaust gas flow passage 34 from each other, on a side closer to the oxidizer gas chamber 32.

Figure 4:
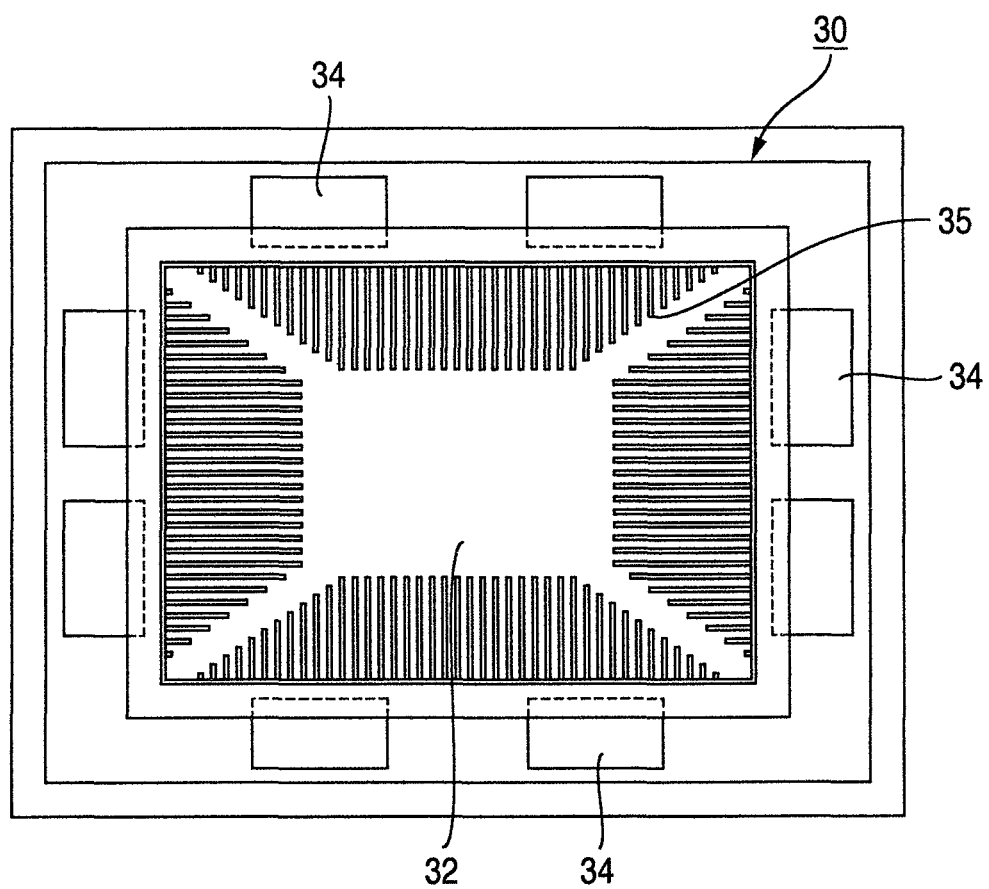
FIG. 4 is a sectional view taken along a line B-B in FIG. 2.

In this embodiment, the heat-exchange fins 35 are disposed on a substantially entire inner surface of the oxidizer gas chamber 32, as shown in FIG. 4. In this arrangement, a larger amount of heat of the combustion gas is transferred to the oxidizer gas flowing along a wall surface of the oxidizer gas chamber, as compared with the oxidizer gas flowing through the central area of the oxidizer gas chamber. The oxidizer gas flowing along a wall surface of the oxidizer gas chamber is introduced into an outer peripheral area of the fuel cell body 10.

Therefore, the oxidizer gas introduced in the fuel cells disposed in the outer peripheral area of the fuel cell body can be heated to a higher temperature, as compared with the oxidizer gas introduced into the fuel cells disposed in a center area of the fuel cell body. The oxidizer gas 31 introduced into the fuel cells 11 disposed in the outer peripheral area of the fuel cell body 10, which is a part of the oxidizer gas flowing into the oxidizer gas chamber 32, is raised in temperature immediately before flowing into the oxidizer gas-introducing pipes 14, and flows intact into the oxidizer gas-introducing pipes 14. On the other hand, the oxidizer gas introduced into the fuel cells disposed in the central area of the fuel cell body 10 flows into the oxidizer gas-introducing pipes 14 at substantially the same temperature as when it has flowed from the oxidizer gas-supplying pipe 31 into the oxidizer gas chamber 32, because the heat-exchange fin is absent in the central area of the fuel cell body 10.

From the above, the oxidizer gas 31 which has been wormed to an appropriate temperature by the combustion exhaust gas when flowing through the oxidizer gas-supplying pipe 33 is supplied to the fuel cells disposed in the central area of the fuel cell body. The oxidizer gas 31 which has been heated by the heat-exchange fins 35 to a further raised temperature appropriate for the outer peripheral area of the fuel cell body is supplied to the fuel cells disposed in the outer peripheral area of the fuel cell body.

The heat-exchange fins 35 are capable of adjusting an amount of exchanged heat by changing their shapes and sizes. The heat-exchange fins 35 are also capable of adjusting the amount of exchanged heat by changing the spacing between them. It is desirable that the spacing between the fins is reduced in an area where the amount of a heat transferred by the heat exchange is desired to be increased.

In FIG. 1, the heat-exchange fins 35 are mounted only on the side closer the oxidizer gas chamber 32, but they may be mounted only on the side closer to the combustion exhaust gas flow passage 34 or on both of the sides closer to the oxidizer gas chamber 32 and the combustion exhaust gas flow passage 34. It is preferable that each of the heat-exchange fins is formed of a metal plate having a good thermal conductivity such as an aluminum plate.

In order to ensure that the heat of the combustion exhaust gas is transferred by heat exchange to the oxidizer gas flowing through the oxidizer gas-supplying pipe 33, it is desirable that the oxidizer gas-supplying pipe 33 is spirally formed in a shape so that the combustion exhaust gas is drawn around in the combustion exhaust gas flow passage 34. It is possible to adjust the amount of exchanged heat by adjusting the length of the oxidizer gas-supplying pipe 33. It is also possible to adjust the amount of exchanged heat by mounting the heat-exchange fins outside the oxidizer gas-supplying pipe 33.

As discussed above, according to this embodiment, the gas having the high temperature can be supplied to the lower-temperature area of the fuel cell body by utilizing the heat of the combustion exhaust gas generated by the combustion of the unreacted oxidizer gas and the fuel gas. Thus, it is possible to eliminate the variation in temperature between the fuel cells.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A header for supplying a gas in a fuel cell, the header being designed to be mounted in a fuel cell power system comprising a fuel cell body having a plurality of fuel cells therein, wherein a fuel gas and an oxidizer gas are passed through the fuel cell body for a power-generating reaction and then unreacted gases are subjected to a combustion reaction to generate a combustion exhaust gas, the header comprising: a gas chamber having a plurality of distributing ports so that the fuel gas or the oxidizer gas is distributed to the plurality of fuel cells within the fuel cell body; and a combustion exhaust gas flow passage through which the combustion exhaust gas generated in the fuel cell body is passed, so that a heat of the combustion exhaust gas is transferred to the fuel gas or the oxidizer gas in the gas chamber by heat exchange, wherein the header includes heat-exchange fins placed in an outer peripheral area of the fuel cell body for transferring the heat of the combustion exhaust gas to the fuel gas or the oxidizer gas by heat exchange, so that the fuel gas or the oxidizer gas having a higher temperature is supplied to a lower-temperature area of the fuel cell body, and the fuel gas or the oxidizer gas having a lower temperature is supplied to a higher-temperature area of the fuel cell body, wherein the combustion exhaust gas flow passage is disposed adjacent to the gas chamber, and the heat-exchange fins are placed on a partition wall, which partitions the gas chamber and the combustion exhaust gas flow passage from each other, on a side closer to the gas chamber or on a side closer to the combustion exhaust gas flow passage or on both of them, and wherein at least one of a thickness of the heat-exchange fins, a size of the fins and a distance between the fins is configured to control the amount of the heat of the combustion exhaust gas transferred by heat exchange to the fuel gas or the oxidizer gas in the gas chamber.

2. The header according to claim 1, wherein the fuel cells are solid oxide fuel cells.

3. The header according to claim 1, wherein the heat exchange fins are arranged so that a larger amount of heat of the combustion exhaust gas is transferred to the fuel gas or the oxidizer gas to be introduced into the fuel cells disposed in the outer peripheral area in the fuel cell body.

4. The header according to claim 1, wherein the heat-exchange fins are mounted on the partition wall in the vicinity of an area where the gas distributing ports for distributing the fuel gas or the oxidizer gas to the outer peripheral area are provided, so that a larger amount of heat of the combustion exhaust gas is transferred by heat exchange to the fuel gas or the oxidizer gas in the gas chamber, which is introduced into the fuel cells disposed in the outer peripheral area in the fuel cell body.

5. A header for supplying a gas in a fuel cell, the header being designed to be mounted in a fuel cell power system comprising a fuel cell body having a plurality of fuel cells therein, wherein a fuel gas and an oxidizer gas are passed through the fuel cell body for a power-generating reaction and then unreacted gases are subjected to a combustion reaction to generate a combustion exhaust gas, the header comprising: an oxidizer gas chamber having a plurality of distributing ports so that the oxidizer gas is distributed to the plurality of fuel cells in the fuel cell body; an oxidizer gas-supplying pipe for supplying the oxidizer gas to the oxidizer gas chamber; and a combustion exhaust gas flow passage through which the combustion exhaust gas is passed, wherein the header includes heat-exchange fins placed in an outer peripheral area of the fuel cell body for transferring a heat of the combustion exhaust gas to the oxidizer gas by heat exchange, so that the oxidizer gas having a higher temperature is supplied to a lower-temperature area of the fuel cell body, and the oxidizer gas having a lower temperature is supplied to a higher-temperature area of the fuel cell body, wherein the combustion exhaust gas flow passage is disposed so that the combustion exhaust gas flows around the oxidizer gas chamber and around the oxidizer gas-supplying pipe, and the heat-exchange fins are placed on a partition wall, which partitions the oxidizer gas chamber and the combustion exhaust gas flow passage from each other, on a side closer to the oxidizer gas chamber or on a side closer to the combustion exhaust gas flow passage or on both of them, and wherein at least one of a thickness of the heat-exchange fins, a size of the fins and a distance between the fins is configured to control the amount of the heat of the combustion exhaust gas transferred by heat exchange to the oxidizer gas in the oxidizer gas chamber.

6. The header according to claim 5, wherein the heat of the combustion exhaust gas flowing through the combustion exhaust gas flow passage is transferred to the oxidizer gas flowing through the oxidizer gas-supplying pipe by heat exchange, after the heat is transferred to the oxidizer gas within the oxidizer gas chamber by heat exchange.

7. The header according to claim 6, wherein the heat-exchange fins are mounted on the partition wall in the vicinity of an area where the gas distributing ports for distributing the oxidizer gas to the outer peripheral area are provided, so that a larger amount of heat of the combustion exhaust gas is transferred by heat exchange to the oxidizer gas in the oxidizer gas chamber, which is introduced into the fuel cells disposed in the outer peripheral area in the fuel cell body.

8. The header according to claim 6, wherein the heat-exchange fins are placed on the partition wall partitioning the oxidizer gas chamber and the combustion exhaust gas flow passage from each other, and the fins have a thickness, a size and a fin-to-fin distance configured to transfer a larger amount of the heat of the combustion exhaust gas to the oxidizer gas supplied to the oxidizer gas chamber, which is distributed to the outer peripheral area of the fuel cell body, as compared with the gas distributed to the center area of the fuel cell body.

9. A fuel cell power system comprising: a fuel cell body comprising a plurality of fuel cells; a fuel gas-supplying header for distributing a fuel gas to the plurality of fuel cells in the fuel cell body; and an oxidizer gas-supplying header comprising: an oxidizer gas chamber having a plurality of gas distributing ports for distributing an oxidizer gas to the plurality of fuel cells in the fuel cell body; an oxidizer gas-supplying pipe for supplying the oxidizer gas to the oxidizer gas chamber; and a combustion exhaust gas flow passage, wherein after the fuel gas and the oxidizer gas contribute to a power-generating reaction within the fuel cell body, unreacted gases are subjected to a combustion reaction to generate a combustion exhaust gas which is discharged from the fuel cell body, wherein the system includes heat-exchange fins placed in an outer peripheral area of the fuel cell body for transferring a heat of the combustion exhaust gas generated in the fuel cell body to the gas within the fuel gas-supplying header and/or the gas within the oxidizer gas-supplying header with a gas temperature profile, so that the fuel gas and/or the oxidizer gas having a higher temperature are/is supplied from the fuel gas-supplying header and/or the oxidizer gas-supplying header to a lower-temperature area of the fuel cell body, and wherein the combustion exhaust gas flow passage is disposed so that the combustion exhaust gas flows around the oxidizer gas chamber and around the oxidizer gas-supplying pipe, and the heat-exchange fins are mounted on a partition wall, which partitions the oxidizer gas chamber and the combustion exhaust gas flow passage from each other, on a side closer to the oxidizer gas chamber or on a side closer to the combustion exhaust gas flow passage or on both of them.

10. The system according to claim 9, wherein the fuel cells are solid oxide fuel cells.

11. The system according to claim 10, wherein the heat of the combustion exhaust gas flowing through the combustion exhaust gas flow passage is transferred to the oxidizer gas flowing through the oxidizer gas-supplying pipe by heat exchange, after the heat is transferred to the oxidizer gas in the oxidizer gas chamber by heat exchange.

12. The system according to claim 11, wherein the heat-exchange fins are mounted on the partition wall in the vicinity of an area where the gas distributing ports for distributing the oxidizer gas to the outer peripheral area are provided, so that a larger amount of the heat of the combustion exhaust gas is transferred by heat exchange to the oxidizer gas in the oxidizer gas chamber, which is introduced into the outer peripheral area in the fuel cell body.

13. The header according to claim 1, further comprising a spiral shaped oxidizer gas-supplying pipe for supplying the oxidizer gas to the gas chamber, wherein the spiral shape of the oxidizer gas-supplying pipe ensures that heat exchange is conducted between the oxidizer gas in the oxidizer gas-supplying pipe and the combustion exhaust gas in the combustion exhaust gas flow passage.

14. The header according to claim 5, wherein the oxidizer gas-supplying pipe is spiral shaped, to ensure that heat exchange is conducted between the oxidizer gas in the oxidizer gas-supplying pipe and the combustion exhaust gas in the combustion exhaust gas flow passage.

15. The system according to claim 9, wherein the oxidizer gas-supplying pipe is spiral shaped, to ensure that heat exchange is conducted between the oxidizer gas in the oxidizer gas-supplying pipe and the combustion exhaust gas in the combustion exhaust gas flow passage.

16. The system according to claim 10, wherein the oxidizer gas-supplying pipe is spiral shaped, to ensure that heat exchange is conducted between the oxidizer gas in the oxidizer gas-supplying pipe and the combustion exhaust gas in the combustion exhaust gas flow passage.

* * * * *